United States Patent Office 3,481,789
Patented Dec. 2, 1969

3,481,789
CATALYST BODY AND GAS DIFFUSION ELECTRODE AND FUEL CELL THEREWITH
August Winsel, Braunschweig, Germany, assignor to Siemens Aktiengesellschaft, Berlin, Germany, and Varta Aktiengesellschaft, Hagen, Westphalia, Germany, both corporations of Germany
No Drawing. Filed Oct. 12, 1965, Ser. No. 495,323
Claims priority, application Germany, Oct. 20, 1964, S 93,798
Int. Cl. H01m 27/04; B01j 11/00
U.S. Cl. 136—86                    6 Claims This invention concerns new catalytic bodies which are especially well suited for the electrochemical resolution and separation of gases in electrochemical cells which are designated as gas diffusion electrodes. The invention also concerns a method for making such catalytic bodies.

Gas diffusion electrodes are porous bodies which form a separation wall between the gas and the electrolyte space. Under the influence of capillary pressure, the electrolyte penetrates the pores of the electrode until it reaches the point where the capillary pressure is in an equilibrium with the pressure from the gas. There, the electrochemically reactive zone of the electrode, electrolyte and gas can form itself in a relatively stable position. This is the active electrochemical area which is generally referred to as the three-phase interface.

Electrodes have been constructed which have two layers of pores of distinguishably different diameters. One layer, the protective layer, is riddled with the small size pores and faces the electrolyte, the other layer, the operating layer, is riddled with coarser pores and faces the gas phase. In such electrodes, it is possible to establish, at a suitable pressure, the meniscus where the electrolyte and gas are in contact at the surface boundary of these two layers. To that effect, the gas pressure must be greater than the capillary pressure in the layer of large pores and lesser than the capillary pressure in the layer of finer pores.

It is already known in the art to construct diffusion electrodes of fine nickel powder, carbon powder or of other powdered materials, which are electrically conductive materials. The necessary catalytic properties are imparted to the electrodes in various suitable ways. There may be added to the powder or powder mixture catalytically active materials before the making of the electrode, or the catalyst may be added on or incorporated in the already built electrode body.

An electrode of this type known in the art is the so-called double skeleton electrode (DSK electrode) which is described, for instance, in U.S. Patent No. 2,928,891 to Justi et al. Such an electrode is made by mixing a mixture of an electronic conducting powder with a powder of a Raney alloy. The resulting mixture is formed into an electrode under pressure and, thereafter or concurrently sintered. Thereafter, the inactive components of the Raney Hg alloy (Al, Zn, Mg) are leached out of the Raney-nickel alloy. In this manner, there is formed a structure having a carrier skeleton which has metallic conduction and in the interspaces of which, the catalytic substance proper, the highly active Raney-metal catalyst is likewise arranged in the manner of a skeleton.

To a limited extent it is possible to control the gas pressure to which an electrode layer is subjected by suitable selection of the size of the particles of the pulverized materials. Normally however, even then the capillary pressure is at an order of magnitude of about 1 atmosphere. In very many situations, it is very desirable to operate at even lower gas pressures.

To that effect, coarser particle filler materials have been incorporated into the electrode which are then removed during or after the electrode is completed, thereby creating definite empty spaces, or pores.

In a picture of microsection of the protective layer of a DSK-electrode which already contains the activated fine particles, or grains of Raney Hg metal, one can observe that in the light-shaded areas of the carbonyl nickel skeleton which is riddled by, or permeated with, a multitude of interstices or pores, somewhat darker particles of the Raney Hg nickel stand out. These in turn, are riddled with a submicroscopic interstitial network. The system of the transport pores appears as little black areas. The picture of a microsection of the working layer of a DSK-electrode, is similar except that the size of the particles and pores is larger. And finally, one can observe in a picture of a microsection of a double-working layer electrode, which has the advantage of the so-called gas-conducting layer of limited resistance to the gas stream, that the light-shaded area is the carbonyl skeleton in which there is a capillary system of small pores. In that area appear the larger holes which are created after the large particles of filler have been removed. A typical microsection showing coarse and fine pores of a conventional oxygen electrode can be found in Fuel Cells, vol. 1, Young, Reinhold Publishing Corporation (1960), page 58.

The three above-described layers are all shaped at a temperature of 400° C. under a pressure of about 2 tons per square centimeter.

The comparison of these micro-pictures shows that the additional incorporation of coarse-grained filler material into the ingredients for the preparation of the electrodes creates indeed larger pores. However, the largest portion of the electrochemically and catalytically active material remains, as a matter of necessity, ineffective, under operations at the desired low gas pressures. This results because the boundary interface between the gas and the electrolyte establishes itself immediately at the walls of the larger pores. Only there, does the catalyst, which is in a highly dispersed state in that area, establish contact with the electrolyte and the reaction gas.

It is evident, therefore, that the conventional electrodes have limited efficiency in that they are unable to use any given amount of catalyst in the electrode to its fullest extent. Thus the electrochemical reaction at a stable interface in the electrode is not being carried out as efficiently as is required. Hence, there is a serious need for electrodes capable of efficiencies of electrochemical conversion approaching theoretical values.

It is therefore an object of the invention to provide an electrode in which the catalyst is located in a most effective manner in the boundary area formed by the larger pores between the reaction gas and the electrolyte.

It has been discovered, in accordance with the invention, that an electrode structure only meets the optimum requirements when the walls of the coarser pores, which carry reaction gas, are coated with the catalytic material. The remainder of the electrode body is riddled or permeated with smaller pores and may be free of catalytic material. In such an electrode, the smaller pores serve for the exchange of material between the free electrolyte and the triphase reaction zone which establishes itself immediately at the location of the catalyst.

The electrode body of the invention has remarkable electrochemical efficiency, as compared to the conventional DSK-electrode. Moreover, the electrode body possesses increased mechanical rigidity because of the omission of the Raney alloy as the powder component of greater catalytic effectiveness from the skeleton structure. Furthermore, the pressure of the reaction gas during operation can be very substantially reduced without the electrolyte penetrating the gas space located in the interior of the electrode.

The catalytic structure of the invention is made in accordance with the invention by a process which comprises coating the periphery of the coarse particle filler material, or grains with a layer of the catalyst, or a layer of the catalytically containing material. The filler material, coated, or encapsulated with the catalytic material is then mixed with a material capable of forming a porous electrically conductive skeleton carrier. The mixture is then shaped, as desired. During these steps or after shaping, the filler material is removed from the mixture and any unnecessary material that may be present in the skeleton carrier is, likewise, removed. If necessary, the catalyst of the electrode is activated by conventional procedures. The resulting electrode product has embedded in its body the coarser residual pores corresponding to and being created after the removal of the filler material and a porous electrically conductive skeleton material itself riddled with smaller intercommunicating interstices and catalytic material, itself riddled with a microporous interstitial system, located in the boundary area where the porous skeleton structure meets the coarser pores.

It is highly desirable during the process, in order to minimize loss of the catalyst used, that the layer of the catalyst is made to adhere to the periphery of the filler particle firmly enough to withstand the mechanical requirements of the following mixing steps. According to the invention, it is further highly desirable that the catalytic material has the property of affixing itself to the material forming the walls of the larger interstices in a unitary and durable manner.

In accordance with the invention, the filler material is selected from such materials which remain in the body long enough to allow for the catalytic material to be attached to the skeleton material. In one aspect of the process of the invention, the materials may be pressed and then sintered so that the filler material is vaporized or is decomposed during the sintering process creating the residual coarse pores. Alternatively, the materials may be shaped in accordance with the one-step hot pressing technique in which case the filler material selected is resistant to the temperature used during pressure. These methods are known in the art; the hot pressing technique is described, for instance, in Austrian Patent 207,429 (1957).

Suitable filler materials which may be used in accordance with the invention are known in the art. The selection of any particular material is influenced by practical considerations, for instance, the particular pressing and sintering technique preferred. The filler material should be a solid subsequently removable by any suitable means as by heat and/or liquids. These may be organic or inorganic solvents. Mixtures may be used. Any of these means may be used in combination or individually in any sequence designed to achieve the removal of the filler material. Merely illustrative of the filler materials, the following may be listed: inorganic materials such as ammonium bicarbonate, ammonium carbonate, sodium carbonate and bicarbonate, sodium nitrate, potassium or sodium chloride, sodium or potassium silicate, ammonium chloride. Amongst the organic fillers there may be listed: salicylic acid, camphor, various metal stearates such as zinc, calcium, lithium stearates, boric acid, citric acid, or there may be selected a filler from the blowing agents which are used in the foaming of resins, such as 2,2'-azoisobutyronitrile, azo-hexahydrobenzonitrile, benzene sulfonylhydrazide and the like; or there may be used metallic fillers such as aluminum, zinc, iron. There may also be used synthetic resins such as thermoplastic resins soluble in water or in an organic solvent, such as vinyl resins, vinyl esters (vinyl acetate), polyethylene oxide, polyglycols such as polyethylene glycol; polyvinyl pyrrolidinone, and the like. The homopolymers or copolymers may be used. The filler material may be removed from the electrode body by the means best suited to the particular steps used. When cold pressing technique is used, the filler materials such as magnesium carbonate, ammonium chloride, or citric acid or particles of a vinyl resin, as polyvinyl chloride, are removed, for instance, volatilized during the sintering step. Other fillers which withstand the sintering process are dissolvable with a suitable solvent, such as various aliphatic or aromatic hydrocarbons, ethers, esters, ketones, alcohols, and the like.

In order to coat the filler material with the catalytic substance, it is generally advisable to carry out the mixing in the presence of a liquid, organic or inorganic, to promote the adhesion of the catalyst to the walls of the filler. Any suitable adhesion promoter may be used such as shellback, camphor, paraffin, various thermoplastic resins, e.g. vinyl resins, vinyl acetate, and the like.

Alternatively, the filler's surface may be made tacky, as by heating sufficiently to facilitate the catalyst being taken up by the filler's walls. Any means for promoting the coating of the filler with the catalyst powder is suitable. The catalyst material, or powdered mixture comprising the catalyst material may be deposited onto the surfaces of the filler by other methods such as deposition, precipitation, condensation, and other such techniques. During the process of the invention, the catalyst, after being embedded in the skeleton material, becomes affixed thereto, as by sintering.

Any type of catalytic substance is useful for the purposes of the invention. There may be used any Raney alloy, such as nickel Raney alloy, the noble metals, such as platinum or palladium, silver; titanium, vanadium, zirconium, chromium, copper, iron, cobalt; oxides of a transition metal, such as magnesiumoxide, cobalt oxide, nickel oxide, cobalt molybdate; or of the spinel type, i.e. a combination of bivalent and trivalent oxides of magnesium, zinc, iron, manganese, aluminum, and chromium. Alloys of these substances can also be used.

It is an unexpected advantage of the electrode of this invention that it contains less catalyst than a conventional electrode per unit weight and yet has remarkably increased catalytic efficiency. In order to promote the coating of the grains of the skeleton material in the boundary area with the coarse pores to the fullest extent, it is desirable that the surface of the filler particles be coated, at least to a major proportion, i.e. at least 50%, and preferably at least 80% and more preferably at least 90% with the catalyst material. As a practical measure to promote maximum covering of the filler grains, the grains are mixed with enough catalyst or catalyst containing powder, so that no physical contact exists between the individual filler grains. In this manner, ideally each filler grain creates its individual pore upon removal of the filler from the body.

The catalyst coated filler material is, in accordance with the invention, mixed with a sinterable material forming a porous, electrically conductive skeleton. Such suitable materials are known and are described, for instance, in Justi's patent, U.S. 2,928,891. Suitable materials include carbonyl nickel, cobalt, iron, carbon, and various alloys, and the like. By mixing with the skeleton material another material removable during the processing steps, the porosity of the skeleton can be further controlled. Since the major proportion of catalytic material is, in accordance with the invention, disposed at the periphery of the coarser pores, there is no need to have additional catalyst present in the skeleton material. If desired, this can also be done, however. The total porosity of the electrode body, the size (as measured by the diameter) of the pores, the relative size of the interstices in the skeleton structure and the pores, can be varied and selected to suit best the requirements and needs under operative conditions, in particular the pressure of the gas fuel. The small pores in the skeleton may range from diameters too small to measure to an average diameter of about 30 microns, generally from 0.1 to 10, preferably from 2 to 7 microns, but they may be also larger as of 50 microns. The larger pores may measure, as an average, a diameter ranging from about 10 to 1000 times that of the smaller pores.

The relative volume of coarse pores to small pores can be made to suit the desired purpose intended for the electrode body, including the pressure at which the fuel cell will be operated. In general, the ratio of total volume of the gas-carrying coarse pores to that of the electrolyte-carrying small pores in the skeleton structure may range from about 1 to 1 to about 1 to about 3.0. The volume of the smaller pores may also be increased to reach a ratio of 1 to 5. The total volume of the large pores can also exceed that of the smaller pores, such as by a ratio of 5 to 1.

When the electrode body of the invention is used in fuel cells with a liquid electrolyte, those openings of the coarse pores which are in contact with the electrolyte are covered with a suitable gas-impervious means to prevent contact between gas and electrolyte in that area. Alternatively, the electrolyte may be provided in an immobilized form in a diaphragm which has small pores in the area of contact with the electrode. If the diaphragm has pores that are larger than the small pores of the electrode, a gas-impervious layer with small pores can be affixed on the electrode. When the electrolyte is provided as a solid electrolyte as an ion-exchange membrane, the membrane itself serves as the gas-impervious means. The gas-impervious layer may be electrically conductive or not; it may be glued, sprayed or sintered, or affixed through other suitable means on the electrode surface. The layer has a porosity so that the average diameter of its pores is smaller than that of the coarse pores of the electrode. The layer can be a porous synthetic resin, such as polyethylene, polystyrene, polyvinylchloride; or asbestos, glass fibers, or any other known suitable materials that are alkali resistant and gas-impervious can be used.

The catalytic body of the invention may be used as oxygen or fuel electrodes in typical fuel cells. An individual fuel cell is ordinarily made up of a cell container, two conducting electrodes consisting of or impregnated with a material having a catalytic effect upon the desired electrochemical reactions, insulators, connecting means associated with each electrode for establishing electrical contact with an external ciruit, means for introducing an oxidizing gas to a cathode, means for introducing a fuel to an anode, and an electrolyte. A suitable electrolyte may be used such as strong bases (KOH, NaOH, LiOH, etc.) and acid electrolytes ($H_3PO_4$, HCl, $H_2SO_4$, etc.) and others.

The following examples are merely illustrative of the invention. They are not to be construed as a limitation thereto.

EXAMPLE 1

Powdered potassium chloride of a particle size of about 100 to 300 microns is wetted with a solution of 1 part by weight of nitrocellulose resin in 5 parts by weight of acetone, the mixture is then dried by stirring. The potassium chloride powder is admixed with stirring to a Raney nickel alloy (Al to Ni, in a ratio of about 1 to 1 parts by weight), the Raney nickel having a particle size of about 6 microns. The excess alloy powder is screened off.

The coated filter material is then mixed with carbonyl nickel powder in a ratio of 1 to 3 parts by weight. From this mixture, 20 grams are pressed and shaped in a die of 40 mm. diameter at 400° C. under a pressure of 30 tons into an electrode body. The potassium chloride filler and the aluminum of the Raney nickel alloy are dissolved out with a 5 N potassium hydroxide solution. In the electrode the ratio of total coarse porosity to fine porosity is about 1 to 1.3.

The electrode which is obtained has remarkable mechanical strength and it operates satisfactorily as an hydrogen diffusion electrode already at a pressure as little as 0.2 atmosphere.

EXAMPLE 2

A poly vinyl acetate powder having a particle size of 100 to 200 microns is mixed with a large amount of Raney nickel alloy powder (50 weight percent of nickel) having a particle size of less than 6 microns. There is used enough Raney nickel alloy so that the individual particles of the thermoplastic resin do not contact each other, as they are dispersed in the powder of the catalyst alloy material. The mixture is then heated to about 130° C. during which the synthetic resin softens and the Raney nickel catalyst alloy is bound as a coating to the resin particles. After cooling, there is thus formed a hull of catalyst around each particle of the thermoplastic resin. The excess of Raney nickel alloy powder is separated by screening.

The hulled resin particles are then mixed with carbonyl nickel powder in an amount of 1 to 3 by weight. About 20 grams of this mixture is then introduced into a matrix of 40 mm. of diameter and pressed without heat under a pressure of 30 tons and then sintered for 30 mintues at a temperature of 650° C. under an inert gas. The aluminum is extracted with 6 N KOH. The ratio of total volume of coarse to fine porosity of the electrode is 1 to 1. The electrode had excellent rigidity and was operated under an hydrogen pressure of as low as 0.3 atmospheres.

EXAMPLE 3

Potassium chloride particles of a diameter of about 100 to 150 microns are wetted with a solution of nitrocellulose resin in acetone and then mixed with a fine powder of molecular silver of a particle size of less than 5 microns. The excess of molecular silver powder is screened off after drying the mixture.

The skeleton for the electrode is made of carbon powder (Nuchar C) which is mixed with polyethylene powder serving as the binder, in a weight ratio of 1.0 to 0.3 of carbon powder to polyethylene. The potassium chloride particles coated with the silver powder are then mixed with the carbon-polyethylene powder in a weight ratio of 1 to 1. There are placed 10 grams of this mixture into a matrix of 40 mm. of diameter, the mixture is compressed at 200° C. under a pressure of 4 tons. The potassium chloride is then removed by dissolving with water. The ratio of total coarse to fine porosty is 1 to 2.16. The resulting electrode is operated as an oxygen electrode in 6 N potassium hydroxide at a pressure of as low as 0.2 atmosphere.

EXAMPLE 4

Potassium chloride particles of a particle diameter of 100 to 150 mircons are wetted with a solution of shellack in alcohol, and then coated with a Raney silver alloy (65 weight percent silver) having a particle size of less than 5 microns. The mixture is dried and the excess catalyst material is screened off.

The coated particles are then mixed with carbonyl nickel powder in a weight ratio of 1 to 2.5. There are introduced 15 grams of this mixture into a matrix of 40 mm. diameter. The material is then shaped at a temperature of 350° C. under a 9-ton pressure. The remainder of the adhesive is then removed by dissolving with alcohol. The aluminum of the Raney silver alloy and the potassium chloride is then dissolved with a 6 N potassium hydroxide solution. The ratio of total coarse to fine porosity in the electrode is 1 to 1.24. The electrode operates as an oxygen electrode at a pressure of about 0.25 atmospheres.

EXAMPLE 5

There are taken 10 grams of the powdered mixture obtained in Example 1, pressed into shape in a die of 40 mm. of diameter and then coated with 3 grams of carbonyl nickel powder. The electrode body is shaped under a pressure of 30 ton atmosphere at 400° C. In the electrode the ratio of total coarse porosity to fine porosity is 1 to 1.3. The electrode is then activated and can be operated at a gas pressure of as low as 0.2 atmosphere without any electrolyte penetrating the gas area.

Further electrode illustrative of the invention may be made with the following materials.

EXAMPLES 6-18

TABLE I

| Examples | Filler | Catalyst | Skeleton |
|---|---|---|---|
| 6 | Magnesium carbonate | Raney-nickel | Carbonyl nickel. |
| 7 | Ammonium chloride | Raney-silver | Cobalt. |
| 8 | Potassium chloride | Platinum black | Carbon in polyethylene. |
| 9 | Sodium chloride | Raney-nickel | Cobalt. |
| 10 | Aluminum sulfate | Raney-silver | Do. |
| 11 | Aluminum | $ZnAl_2O_4$ | Carbonyl nickel. |
| 12 | Potassium chloronate | Raney-nickel | Carbon. |
| 13 | Polyethylene oxide | $MgAl_2O_4$ | Carbon in polyethylene. |
| 14 | Copolymer of polyvinyl chloride/vinyl acetate | Copper | Do. |
| 15 | Poly (methyl methacrylate) | Raney-silver | Carbonyl nickel. |
| 16 | Polystyrene | Palladium | Do. |
| 17 | Polyvinyl pyrrolidinone | Raney-nickel | Carbonyl metal. |
| 18 | Citric acid | Molecular silver | Iron. |

The fillers in Examples 6, 7 and 18 volatilize or decompose during sintering creating the desired coarse pores. Decomposition of the material generally starts at about 100° C. Heating is continued until all of the filler is decomposed. Sintering is normally carried out at about 550° C. The fillers in Examples 8, 9, 10, 11 and 12 are dissolved out of the skeleton after sintering with a solution of alkali. The resins in Examples 13 and 17 are dissolved out with water at pH about 7; those in Examples 14 and 15 with acetone and in Example 16 with benzene. The electrodes are made by pressing under a suitable pressure (e.g. 3000 to 7000 atmospheres) and sintered at a temperature from about 500° to 1000° C. or by hot-pressing. The resulting electrodes when used as gas diffusion electrodes in a fuel cell show excellent efficiency even at low pressures and increased mechanical strength.

The catalytic bodies of the invention are also suited for use as catalysts in various chemical processes.

I claim:
1. A fuel cell comprising an electrolyte and two electrodes, at least one electrode comprising
   an electrically-conductive, self-sustaining sintered skeleton composed of a material free of catalytic activity and having an interstitial network of fine pores which are free of catalytic coating and which are capable of carrying the electrolyte, said fine pores communicating with coarser pores which are distributed throughout the skeleton and which are capable of carrying the reaction gas, and
   a catalyst coating, said catalytic coating being concentrated on the surfaces of those particles of the skeleton which define the larger pores.
2. A catalytic body which comprises an electrically-conductive, self-sustaining, sintered skeleton composed of a material free of catalytic activity comprising an interstitial network of fine pores which are free of catalytic coating and which are in communication with coarser pores distributed throughout the skeleton, and
   a catalytic coating forming the boundaries with the larger pores, said catalytic coating being concentrated on the surfaces of those particles of the skeleton which define the larger pores.
3. The catalytic body of claim 2 in which the average diameter of the interstitial fine pores ranges from about 0.1 to 30 microns and that of the coarser pores is about 10 to 1000 times larger than that of the small pores.
4. The catalytic body of claim 2 in which the skeleton is nickel, cobalt, iron or carbon.
5. The body of claim 2 in which the catalytic coating is sintered onto said particles.
6. The body of claim 2 which comprises
   a porous gas-impervious layer covering the openings of the coarse pores which are in contact with the electrolyte, the average diameter of the pores of said layer being smaller than that of the coarse pores of the electrode.

References Cited

UNITED STATES PATENTS

| 3,019,103 | 1/1962 | Alexander et al. | 75—212 XR |
| 3,201,282 | 8/1965 | Justi et al. | 136—86 |
| 3,201,858 | 8/1965 | Valyi | 29—420 XR |
| 3,248,787 | 5/1966 | Plust et al. | 29—420 |

WINSTON A. DOUGLAS, Primary Examiner

O. F. CRUTCHFIELD, Assistant Examiner

U.S. Cl. X.R.

29—182.2; 75—212, 222; 136—120